UNITED STATES PATENT OFFICE 2,189,833

RESINOUS CONDENSATION PRODUCTS AND METHOD OF PRODUCING SAME

Israel Rosenblum, Jackson Heights, N. Y.

No Drawing. Original application March 25, 1930, Serial No. 438,901. Divided and this application July 12, 1930, Serial No. 467,624. Renewed March 2, 1933

1 Claim. (Cl. 260—20)

My invention relates to synthetic resins and has for its object to produce resinous condensation products of great complexity and extraordinarily high molecular weight with the aid of a polyhydric inorganic acid or its anhydride.

It is also an object of the present invention to produce synthetic resins of ready solubility in the common solvents, such as mineral spirits, toluol, ethyl acetate, etc., and of substantially neutral reaction, good consistency and body, which are compatible with nitrocellulose and other cellulosic lacquers and may be used in conjunction therewith, and also with a great variety of natural and synthetic gums used in the lacquer and varnish industry.

It is well known that polyhydric alcohols, such as glycerol, may be either completely or partially esterified with monobasic or polybasic acids to produce esters which, in certain cases, are of resinous character or can be condensed or polymerized into resinous or approximately resinous substances by more or less prolonged heating at elevated temperatures. The reactions occurring during the formation of many of the synthetic resinous products are not thoroughly understood, but it is probable that during the first stages of the reaction a part of the polyhydric alcohol is under certain conditions only partially esterified (especially when an excess of the alcohol is present), and that during the subsequent heating the free hydroxyl groups of two molecules condense and become united through an oxygen bond to form a more complex molecule.

According to the present invention, a plurality of molecules of partially esterified polyhydric alcohols (which may or may not themselves be of resinous character) are united or condensed with the aid of an inorganic polybasic acid or its anhydride which directly forms the bond between such molecules. In this way, a plurality of large organic molecules may be condensed by an inorganic acid of relatively low molecular weight, so that a very complex product may be obtained with the use of a comparatively small quantity of inorganic acid. Preferably, the relative quantities of reacting materials and the other conditions are so regulated that the complex substances so produced contain one or more free hydroxyl groups which may then be caused to condense, or the hydroxylated complexes may be treated with other substances, such as acids and acidic resins, as will be described more fully hereinbelow.

In order that my invention may be better understood, I shall describe the same in connection with the production of complex resins from malic acid or its anhydride, glycerol and boric acid.

Malic acid may be caused to be combined in any known manner with an excess of glycerol to produce hydroxy-esters, of which the following simple compounds are illustrative:

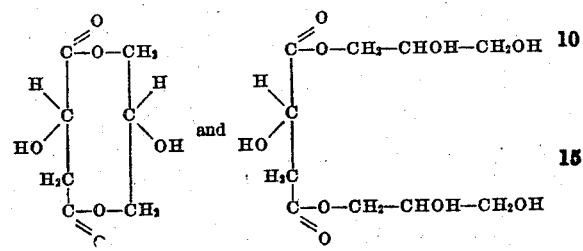

Other compounds are doubtless produced but only these are represented for the sake of simplicity as they are sufficient to illustrate the nature of the present invention. The mixture of hydroxy-esters is then caused to react with boric acid ($H_3BO_3$) at about 140–150° C., whereupon condensation takes place producing, among other compounds, the following comparatively simple compound (assuming that one molecule of boric acid reacts with a molecule of each of the hydroxy-esters formulated above):

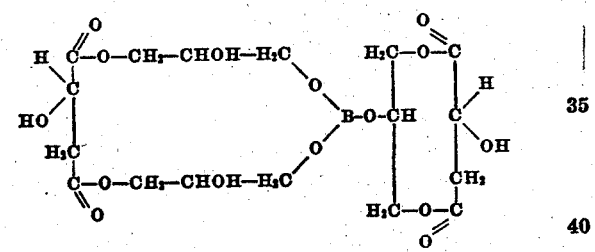

The above compound probably represents only an intermediate product, for the free hydroxyls may condense with the hydroxyl groups of similar products or of non-boronized hydroxy-esters, either directly or with the aid of additional boric acid. It will thus be seen that extreme complexity of molecular structure may be obtained in a number of ways with the aid of the inorganic acid.

The boronized condensates obtained as indicated above are characterized by great body, a property which has heretofore been imparted to glycerol-polybasic organic acid resins only with the aid of additions, such as rosin.

Products of greater solubility and flexibility may, in accordance with the present invention, be obtained by treating the boronized hydroxy-esters with acids until the same are substantially neutral. Organic acids of any kind may be employed, such as acetic, succinic, tartaric, benzoic, phthalic, malic, maleic, etc., and also resin acids, either natural or synthetic. Excellent results are obtained by the use of the higher aliphatic acids, such as oleic, linoleic, linolenic, ricinoleic, stearic, palmitic, and other acids obtainable from drying and non-drying oils and from fats. In general, I prefer to employ rosin or other natural resin (which is, of course, acidic in nature) in conjunction with any of the acids just specified. Improved results are generally obtained if the natural resin, if used, and particularly rosin, is first cracked or dry-distilled, as by heating to a temperature of about 260° C. or above. I may also employ, either alone or together with linoleic or any of the other acids mentioned, a condensation product of phenol, formaldehyde, a natural resin, such as rosin, and an organic salt, such as a zinc soap, specifically zinc abietate, as described in my United States Patents Nos. 1,808,716 and 1,809,570, dated June 2 and June 9, 1931, respectively. The acidic compounds just enumerated will combine with the boronized hydroxy-esters of glycerol and malic acid and neutralize the same, thereby producing extremely complex esters of glycerol with malic acid, boric acid, and one or more of the other organic acids mentioned above.

The reaction may be made to occur in steps, as by first treating the malic acid with glycerol and then reacting the hydroxy-esters so produced with boric acid and finally heating the boronized hydroxy-esters with one or more of the other acids above mentioned until a substantially neutral product is obtained; or else all of the ingredients in proper proportions may be made to react simultaneously.

Instead of combining the condensate of boric acid and the hydroxy glycerol-malic acid esters with the acids mentioned hereinabove, the free basic hydroxyls of these boronized esters may be combined with the acidic compounds obtained by condensing with an excess of boric acid the hydroxy-esters obtained by partially neutralizing glycerol with an organic acid, such as one or more of the acids mentioned above, but preferably with a high molecular weight fatty acid, such as linoleic acid. In this way complex compounds are obtained in which what may be regarded as a nucleus composed of an ester of glycerol and malic acid is joined through boron bonds to one or more other glycerol-malic acid esters and to one or more glycerol esters of other acids. It will thus be clear that, by the aid of an inorganic polybasic condensing medium, I may obtain extremely complex resin molecules of very great variety.

In place of the condensate of boric acid with the hydroxy-esters obtained by partially neutralizing glycerol with a high molecular weight fatty acid, I may employ a condensate of boric acid with the hydroxy-esters obtained by partially neutralizing glycerol with two organic acids, such as linoleic acid and the acid contained in rosin, or, as one of such acids, or alone, I may use the acidic condensate produced by condensing phenol, formaldehyde, rosin (or other natural resin) with an organic salt of zinc or other metal, such as calcium, strontium, barium, magnesium, lead, etc. In general, I prefer to use, in place of the rosin as it is commercially available, rosin which has been heated or cracked in the presence of an organic zinc (or other metal) salt-phenol-aldehyde condensate. By the use of such zinc-phenol-aldehyde condensate, the product is made more resistant, while at the same time the formation of compounds which crystallize out from ethyl acetate solution and are not colloidal or film-forming is prevented. It will be understood that, in place of rosin, other natural resins, such as the fossil resins, may be employed which are similarly dry-distilled or cracked in the presence of an organic salt-phenol-formaldehyde condensate.

By the above procedure, extremely complex resins are obtained which are highly weather and waterproof, have excellent body and are compatible with cellulosic lacquers. My novel boronized condensate produce varnishes having a very glossy and lustrous surface. They also make excellent wood fillers and, as stated, may be used in conjunction with nitrocellulose lacquers.

In place of malic acid, I may use substantially equivalent quantities of maleic acid, or of the anhydrides of these acids, or mixtures thereof.

Several modes of carrying out my invention are described hereinbelow, but it will be understood that the examples are given by way of illustration only and are not to be construed in a limiting sense.

*Example 1.*—134 grams of malic acid, 62 grams of boric acid and 200 grams of glycerol are heated at about 200° C. for three hours. There are then added 280 grams of linoleic acid and the heating continued, the temperature being gradually raised to about 240° C. The reaction is complete when a sample of the product is completely soluble in toluol. The gum so produced is compatible with nitrocellulose in all proportions and imparts to the lacquer great durability and gloss.

*Example 2.*—134 grams of malic acid, 10 grams of boric acid, and 100 grams of glycerol are heated to about 200° C. and maintained at that temperature for two hours. There are then added 140 grams of stearic acid or linoleic acid and the heating continued, the temperature being raised to about 230° to 240° C. The reaction is complete when a sample dissolves completely in toluol.

*Example 3.*—134 grams of malic acid, 31 grams of boric acid and 150 grams of glycerol are heated together with 50 grams of the acidic condensate obtained by condensing phenol, formaldehyde, and an organic salt of a metal, such as zinc, as described in my above-mentioned patents, and 140 grams of stearic acid. The temperature is maintained at about 240° C. until a sample is found to be completely soluble in toluol. The resin obtained is compatible with solutions of nitrocellulose.

*Example 4.*—A mixture of 134 grams of malic acid, 31 grams of boric acid, 150 grams of glycerol, and 280 grams of linoleic acid are heated at about 180° C. until a sample taken from the reacting mass is found to be clear. The temperature is then increased to about 230° C. and the reacting mass kept at such temperature until a sample is found to be completely soluble in toluol.

*Example 5.*—280 grams of linoleic acid, 200 grams of glycerol, and 62 grams of boric acid are heated to about 150° C. for two hours. There are then added 134 grams of malic acid and the heating continued at about 240° C. until the reacting mass is found to be soluble in toluol.

*Example 6.*—The procedure given under Example 5 may be followed except that, in place of the linoleic acid, there is used a mixture of linoleic and stearic acids in the equivalent molecular quantities.

*Example 7.*—280 grams of linoleic acid, 200 grams of glycerol (98% pure), and 31 grams of boric acid are heated at about 180° C. for two hours. There are then added 67 grams of malic acid, and 300 grams of an organic zinc salt-phenol-formaldehyde condensate (prepared as described in my above-mentioned patents). The temperature is permitted to rise about 230° C. and the mass kept at that temperature until a sample of the product forms a clear solution in toluol.

*Example 8.*—The procedure outlined under Example 7 is followed except that, in place of the zinc salt-phenol-formaldehyde condensate, there is used an equivalent quantity of dry-distilled or non-distilled rosin or any dry-distilled fossil gum.

If desired, an excess of fatty acids may be employed in the examples given above because the same are compatible with my novel boronized condensates.

By the above procedures, water-resistant resins are obtained from dibasic aliphatic acids which are themselves quite soluble in water; and homogeneous, soluble resins are obtained in spite of the fact that glycerol, dibasic aliphatic acids like malic, maleic, succinic, tartaric etc., and relatively large quantities of fatty oil acids usually yield a permanently non-homogeneous system on reaction.

As indicated above, any suitable polyhydric alcohol other than glycerol may be used, such as glycol, mannitol, etc.; in place of malic acid any other organic acid, or its anhydride, monobasic or polybasic, may be used, such as succinic, tartaric, maleic, etc., or any of the high molecular weight acids mentioned above; and in place of boric acid any other suitable polyhydric inorganic acid, such as telluric, phosphoric, arsenic acids, etc., or their anhydrides, may be employed. If desired, the reactions described hereinabove may be made to take place in the presence of a natural resin, preferably dry-distilled, which may act as a solvent, or may supply one of the reacting acids.

The present application is a division of my co-pending application, Serial No. 438,901, filed March 25, 1930.

Where in the claim I employ the term "malic-maleic group" the same is to be understood to mean malic acid, maleic acid, malo-malic acid, their anhydrides, or mixtures of these acidic substances; while the term "boric acid" includes also boric anhydride.

Variations may be resorted to within the scope of the appended claim without departing from the spirit of the invention.

What is claimed is:

The method of producing a resinous condensation product suitable for the manufacture of water-resisting coating compositions which comprises reacting a polyhydric alcohol with a fatty oil acid, boric acid and maleic acid, and simultaneously or subsequently heating the mass with a rosin-containing condensate of a phenol and formaldehyde.

ISRAEL ROSENBLUM.